Figure 1:
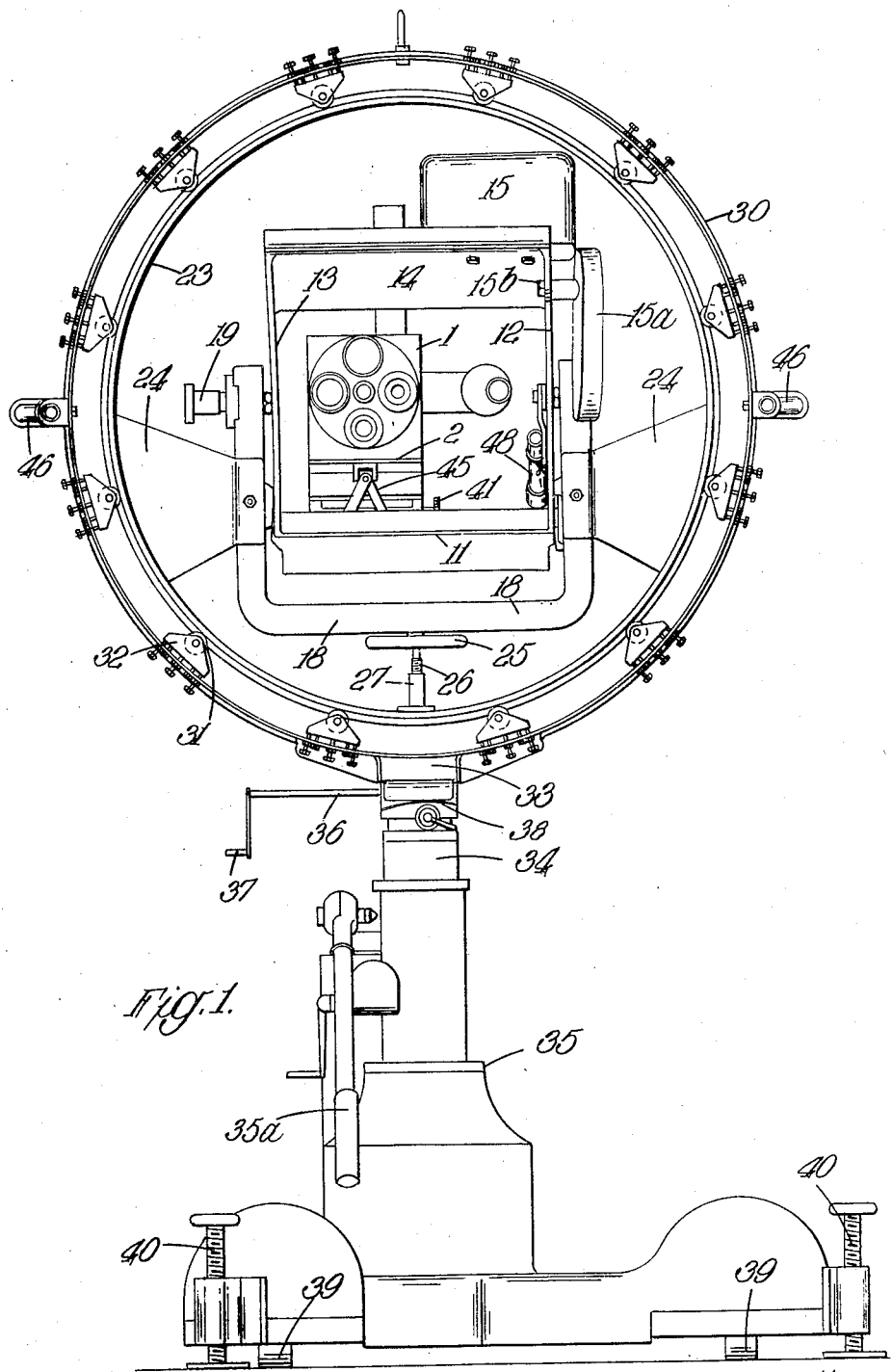

Dec. 5, 1944. S. HOWELL 2,364,363

MOUNTING FOR CINEMATOGRAPH CAMERAS

Filed April 9, 1942 5 Sheets-Sheet 1

Sydney Howell
INVENTOR

Dec. 5, 1944.  S. HOWELL  2,364,363
MOUNTING FOR CINEMATOGRAPH CAMERAS
Filed April 9, 1942  5 Sheets-Sheet 3
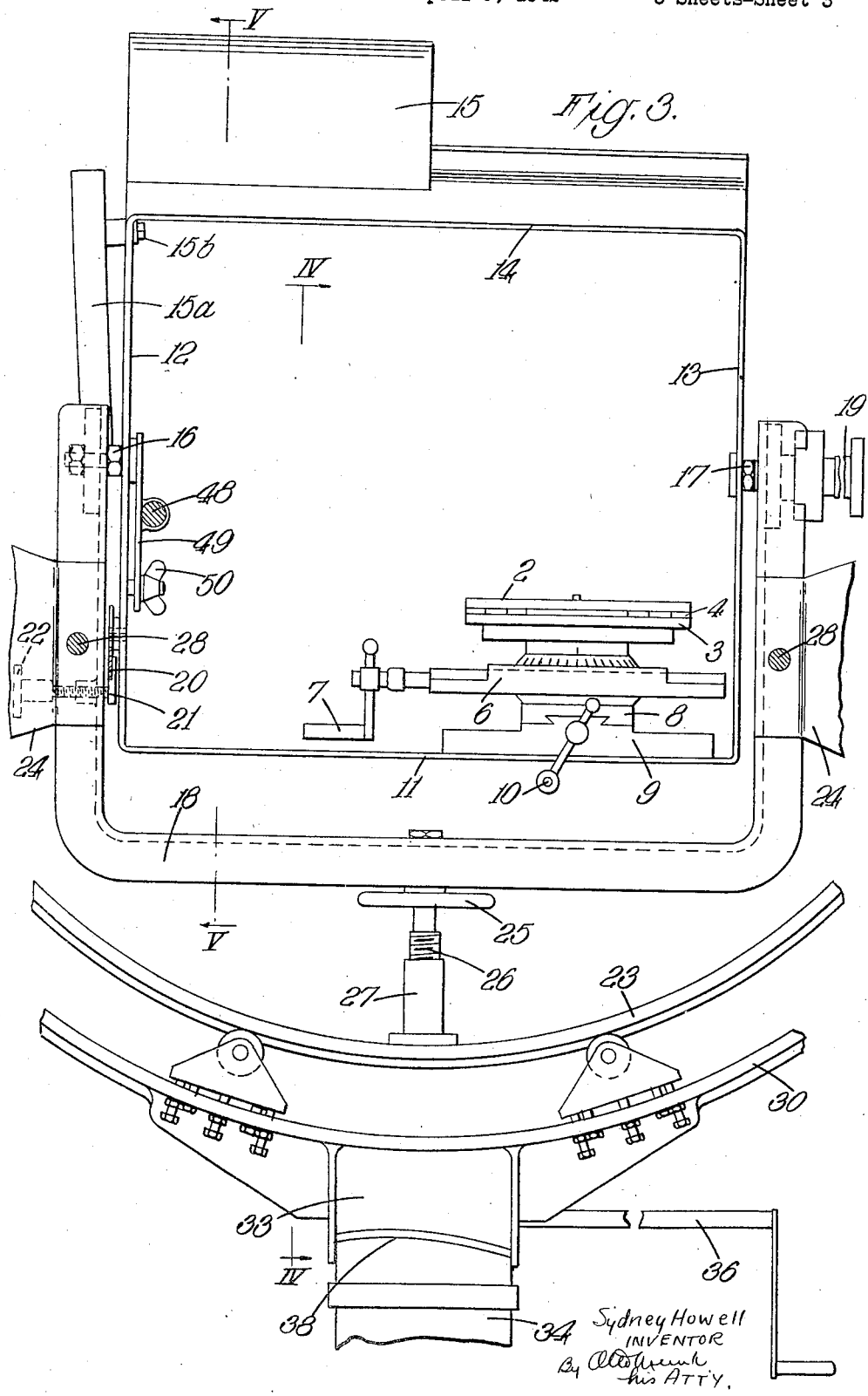

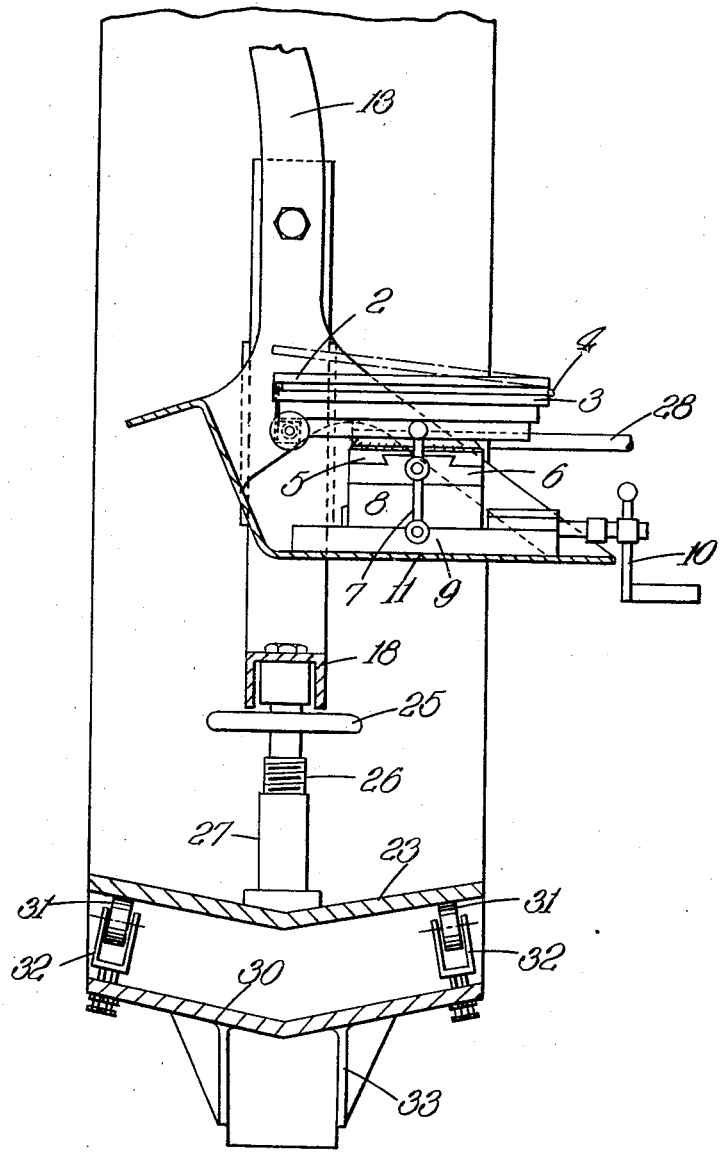

Dec. 5, 1944.  S. HOWELL  2,364,363
MOUNTING FOR CINEMATOGRAPH CAMERAS
Filed April 9, 1942  5 Sheets-Sheet 5
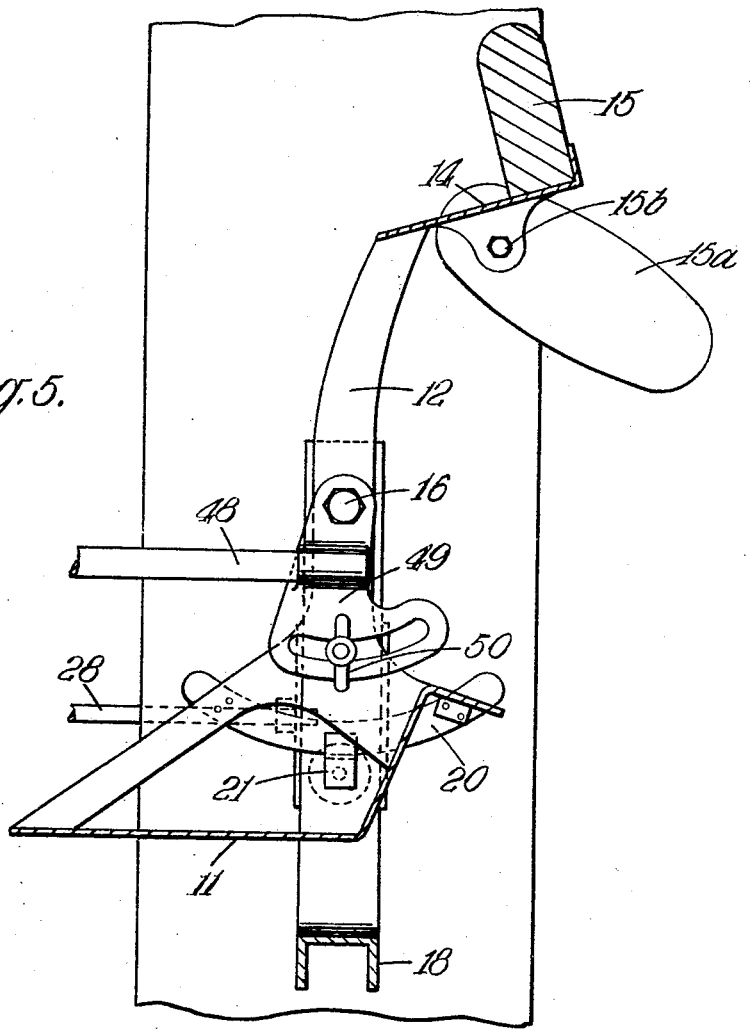
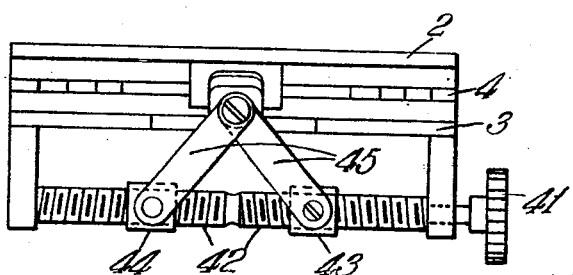
INVENTOR
Sydney Howell
By Otto Munk
his ATT'Y.

Patented Dec. 5, 1944

2,364,363

UNITED STATES PATENT OFFICE 2,364,363

MOUNTING FOR CINEMATOGRAPH CAMERAS

Sydney Howell, Perivale, England, assignor of one-half to Ealing Studios Limited, London, England, a British company Application April 9, 1942, Serial No. 438,221
In Great Britain April 30, 1941

5 Claims. (Cl. 95—86)

This invention relates to an improved mounting for a cinamatographic camera.

In the cinematograph art, particularly for the purpose of obtaining trick effects, it is already known to mount a camera for swinging movement about an axis which may be either horizontal or vertical. Hitherto, in the main, such axis has been more or less arbitrarily chosen relatively to the objective of the camera and, in some cases, the effect is not exactly that desired, since some relative displacement may occur between the foreground and the background.

It has been found that if the camera is moved about an axis which passes through the nodal point of the objective, that is to say through the point of intersection of the light rays, this disadvantage is avoided.

One object of the present invention is to provide a mounting for a camera capable of rotary movement about more than one axis so that the camera may be quickly changed from rotary movement about one axis to movement about another axis without the necessity of using different mountings. Another object of the invention is to provide means for accurately adjusting the position of the camera so that the several axes all pass through the nodal point of the camera objective.

According to the present invention, the mounting for a cinematograph camera is so constructed that rotational movement may occur about one or more of three axes which intersect one another. According to a further feature of the invention, the mounting is capable of adjustment so that each of the rotational axes passes through the nodal point of the camera objective.

In this way, the camera operator may move the camera about any one axis or may pass from rotary movement about one axis to movement about another without interruption of camera operation or may move it about two, or all three of the, axes at the same time.

The means for achieving the rotary movement of the camera about a longitudinal axis conveniently comprises concentric rings adapted for relative movement and it is preferred that the camera be mounted within the one ring for rotational movement about a lateral axis whilst the other ring is mounted for rotational movement about a vertical axis to give the third degree of movement to the camera. In such construction the adjustment for the correct positioning of the camera lens with respect to any one axis is independent of the adjustments with respect to the other axes and, once correctly positioned, the camera may be locked in its adjusted position and may thereafter be used as desired for photography whilst being moved about one or more of the axes or normally for straight photography with a stationary camera as desired.

The rotational movement herein referred to may be rotary in the one direction or the other direction or it may be a swinging or to and fro motion about the axis.

The camera mounting is conveniently mounted on a movable stand which, in the known manner, may be extensible to elevate the camera to a desired height.

In order that the invention may be clearly understood and readily carried into effect, a preferred constructional embodiment is hereinafter more fully described by way of example and with reference to the accompanying drawings which are given by way of illustration but not of limitation.

Figure 2:
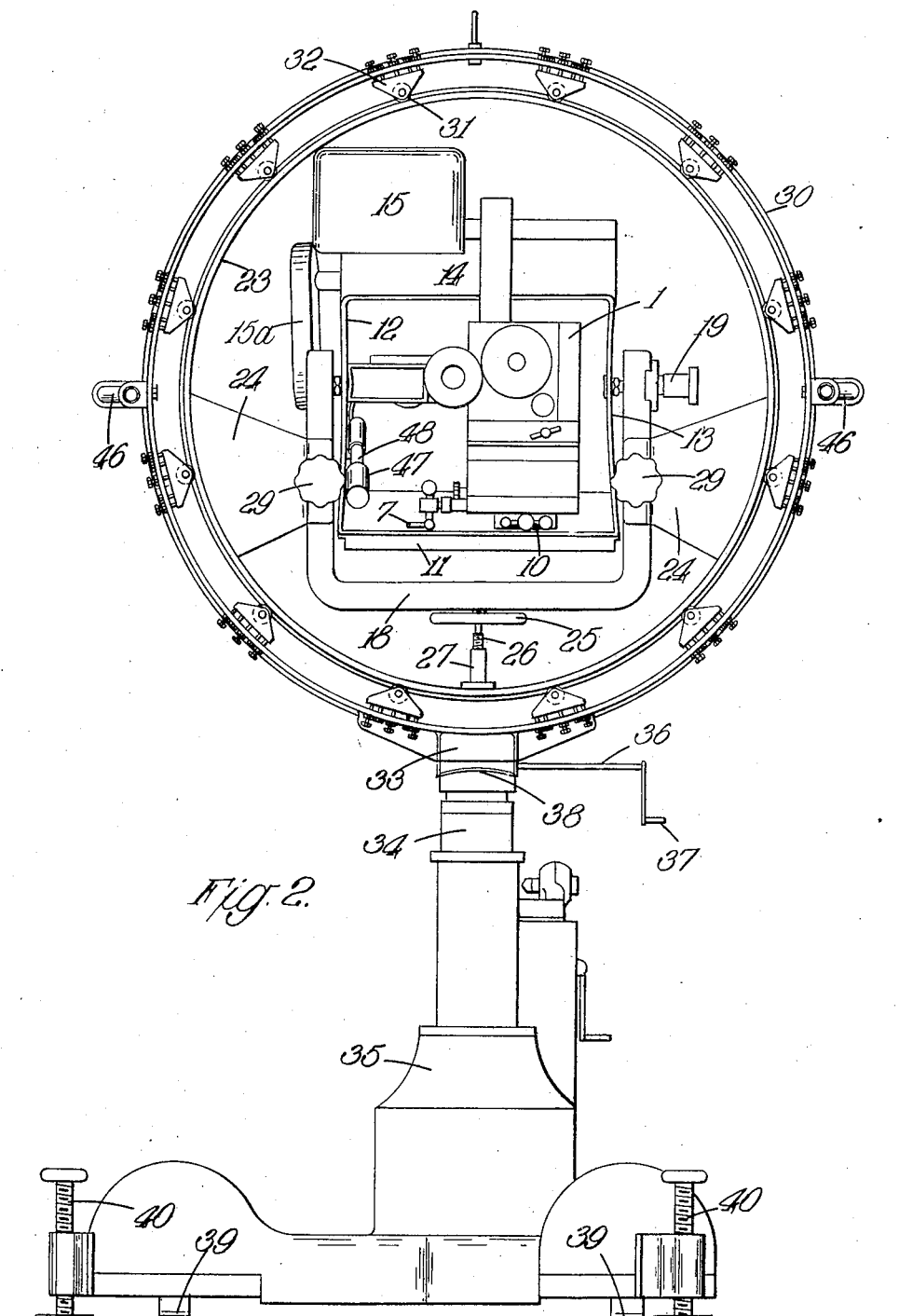

In these drawings:

Figure 1 is a front elevation of the camera, its mounting and a suitable stand therefor, Figure 2 is a rear elevation similar to Figure 1, Figure 3 is a rear elevation on an enlarged scale, of part of the camera mounting, Figure 4 is a sectional elevation taken on the line IV—IV of Figure 3 looking in the direction of the arrows, Figure 5 is a sectional elevation taken on the line V—V of Figure 3 looking in the direction of the arrows, and Figure 6 is a front elevation of the camera base showing the elevating means.

Referring now to the said drawings, a cinematograph camera 1 of any desired known form or construction is mounted on a plate 2 movable relative to a base-plate 3 about a hinge 4 (Figures 4 and 6). The base-plate 3 is either fast with or, as shown, rotatably adjustable about a vertical axis with respect to a slide 5 which is movable horizontally relative to a counterpart 6 under control of a handle 7. The exact nature of the slide and the movement need not be more fully described as it is similar to the work slide of a lathe. The part 6 forms or is made fast to a slide 8 movable relative to a base 9, under control of a handle 10, of the same general construction and extending at right angles to the slide arrangement just described.

The base 9 is supported in a frame comprising a supporting tray 11, side members 12 and 13 and upper member 14, which latter member carries a counterweight 15 adapted to offset the weight of the camera and the other parts carried by the frame. Adjustment of the camera may affect the balance provided by the counterweight 15 and therefore an adjustable counterweight 15a may additionally be provided. The adjustable counterweight 15a is mounted for controlled movement about a horizontal axis so that it may be adjusted to project to a greater or lesser degree to bring its centre of gravity further from or nearer to the pivotal axis of the frame. Adjustment of the counterweight 15a may be effected by slackening and re-tightening the nut 15b. The frame is pivotally mounted for movement about a lateral axis by pivots 16, 17 to a U-shaped cradle 18. To control the movement of the frame relative to the cradle, at least the pivot 17 is provided with friction damping means 19. Further to control the movement thereof, the side member 12 carries a segment 20 adapted to be engaged by a friction member 21 which may be adjustably engaged therewith under control of a handle 22. These means may be employed to lock the frame relative to the cradle. The arrangement just described constitutes the first degree mounting for rotational movement about a lateral axis and also for the adjustment to position that axis accurately to pass through the nodal point of the camera objective.

The cradle 18 is mounted within a ring 23, being supported therein by plates 24 with respect to which it is adjustable. A hand-wheel 25 controls the telescoping of a threaded rod 26 into a member 27 carried by said ring 23, the end of which extensible member, by engaging the cradle 18, moves the same in a vertical direction so that the side limbs thereof move relative to the plates 24. The cradle may be retained in adjusted position by locking the extensible member, although it is preferred that the limbs thereof be made fast to the plates 24 by locking rods 28, to which are connected handles 29. The ring 23 is arranged within another ring 30 so as to be co-axial therewith and with respect to which it is relatively movable round the common axis which is the longitudinal axis and is at right angles to the pivotal axis of the inner frame. The relative rotational movement is permitted by virtue of a plurality of rollers 31 mounted in cages 32 fast with the ring 30. The rings may be freely movable, although means may be provided for checking or preventing such movement. Thus, for example, friction means may be provided or a clamp having portions which lie one on each side of a roller may be placed on the ring 23 to lock that roller to prevent movement of the inner ring 23 relative to the outer ring 30. The rings 23 and 30 constitute the second degree mounting which permits rotational movement of the camera about the longitudinal axis and the adjustable cradle 18 provides the means for adjusting that axis with respect to the nodal point of the objective of the camera.

The outer ring 30 is carried by a bracket 33 which is supported by a vertically extending member 34 capable of rotation about a vertical axis relative to a stand 35. The bracket 33 is laterally displaceable with respect to the part 34, being movable relative thereto by a toothed rack engaging a worm rotatable by the shaft 36 and handle 37. The movement need not be along a straight line but may be along an arcuate path as indicated by the curved lines 38 which indicate the adjacent surfaces of the two relatively movable parts.

The stand 35 may be of generally known construction and the part 34 may be extensible relative thereto under hydraulic control and the stand may be provided with wheels 39 for the movement thereof and also with screw-jacks 40 when it is desired to keep the stand stationary. Movement of the stand is facilitated by the handle 35a.

It will be appreciated that the position for the camera so that the various axes will all pass through the nodal point of the objective cannot be calculated even if the stand were only intended for use with a particular camera, but the adjustment provided in the present construction not only enables a camera to be accurately positioned but, by reason of the ease of adjustment, the camera may be replaced or its lens system changed. The adjustment of the camera will now be described. The camera is made fast to the hinged plate 2 and it is then adjusted so that the axis of the pivots 16, 17 passes through the nodal point of the objective of the camera. The accuracy of this adjustment is tested by swinging the frame about its (the lateral) axis. If there is relative movement between the foreground and the background it will be an indication that the positioning is not correct. If it is thought that the nodal point is in front of or behind the axis, the handle 10 may be rotated to move the slide 8. The result is noted and brought as near perfection as possible. Error may still be present as the nodal point may be above or below the axis and this is rectified by movement of the plate 2 about its hinge 4 which is effected by operating the handle 41 to rotate the worms 42 which are of opposite pitch to cause the slides 43, 44 to move nearer together or away from one another and thereby move the arms 45 and to raise or lower the plate 2 relative to the base 2. If the result i. e. avoidance of relative movement between the foreground and the background is still not perfectly obtained, the camera may not be facing accurately, and this error may be corrected by rotating the base relative to the slide 5 about its axis. Once this adjustment has been made, all these adjustments may be locked, although this is not essential as the construction is such that there is not a tendency for the parts to move. Whilst, for the purpose of description, a sequence of adjustments has been mentioned, it will be appreciated that the adjustments may be made in any other sequence as, of necessity, they are made by trial and error.

The camera is next adjusted for movement about the longitudinal axis. This is effected by rotating the ring 23 through 90°, when it may be noted on the viewing screen that the foreground appears displaced with respect to the background instead of the same merely appearing turned around. Adjustments to displace the camera without affecting the adjustment already made for movement about the lateral axis are effected by moving the cradle relative to its supporting plates by means of the adjustment comprising the parts 25, 26, 27. By appropriate revolving of the inner ring relative to the outer ring, the adjustment is tested and made as near perfect as possible and, thereafter, to bring the nodal point of the objective to the intersection of the two axes and complete the adjustment, the handle 7 is operated to move the slide 5 to move the camera at right angles to the movement of the cradle during its adjustment. This adjustment again does not affect the adjustment for movement about the lateral horizontal axis. After completion of the adjustment for the second degree of movement, the rings are adjusted for the third degree of movement.

This is effected by operating the handle 37 to cause movement of the supporting bracket 33. The rings are swung backwards and forwards about the vertical axis and, if the foreground does not appear stationary relative to the background, adjustments are made until immobility therebetween is obtained, at which time the three axes of movement will intersect as they all pass through the nodal point of the camera objective.

After completion of the adjustments, which need not necessarily be effected in the order stated, the camera may be used for normal photography, the stand being moved backwards and forwards, as desired. Then, when it is desired to swing the camera backwards and forwards about a vertical axis, the rings are moved about that axis conveniently with the aid of handles 46 provided on the outer ring 30. If it is desired to swing the camera to and fro about the lateral axis, the handle 22 is operated to release the frictional grip between the parts 20 and 21 when the frame may be rocked about the axis of the pivots 16 and 17. To facilitate this operation, an operating handle 47 is provided, the shaft 48 of which is made fast to the member 12 of the frame desirably through a quadrant 49 which is adjustable relative to the member 12 under control of a wing-nut 50.

During swinging about either the vertical or the lateral axis, the camera may be displaced at any desired angle to the vertical by a movement of the ring 23 relative to the ring 30 so that the shots are taken at an angle. When spinning of the scene is desired, the ring 23 is continuously rotated relative to the ring 30.

From the foregoing it will be appreciated that the mounting enables the camera to achieve many trick effects and special effects and to pass from one effect to another without interruption.

I claim:

1. A mounting for a cinematographic camera, comprising a stand, a first ring mounted on said stand for rotary movement about a first axis at right angles to the axis of said ring, a second ring coaxial with and supported by said first ring for rotary movement relative thereto about a second axis coinciding with the common axis of said rings, a cradle disposed in the cylindrical space defined by said second ring, means supporting said cradle on said second ring a frame supported on said cradle for pivotal movement relative thereto about a third axis at right angles to said first and second axes, and means for mounting a camera in said frame.

2. A mounting, as claimed in claim 1, including means supporting said first ring on said stand for adjustment relative to said first axis.

3. A mounting, as claimed in claim 1, in which said means for mounting said camera in said frame includes a first slide member mounted on said frame for displacement relative thereto in one direction, a second slide member mounted on said first slide member for displacement relative to the latter in a direction at right angles to that in which said first slide member is displaceable relative to said frame, a camera supporting plate hinged to said second slide member, and means to tilt said camera supporting plate to any desired extent within an angle of about 45° relative to said second slide member.

4. A mounting, as claimed in claim 1, in which said means for mounting said camera in said frame includes two cooperating members rotatable relative to one another about an axis at right angles to said third axis.

5. A mounting for a cinematographic camera, comprising a stand, a first ring mounted on said stand for rotary movement about a first axis at right angles to the axis of said ring, a second ring coaxial with and supported by said first ring for rotary movement relative thereto about a second axis coinciding with the common axis of said rings, a cradle disposed in the cylindrical space defined by said second ring, means supporting said cradle on said second ring for adjustment relative thereto in a direction which is parallel to said first axis when said second ring assumes a predetermined angular position relative to said first ring, a frame supported on said cradle for pivotal movement relative thereto about a third axis at right angles to said first and second axes, and means for mounting a camera in said frame for adjustment relative thereto in two directions substantially parallel to said second and third axes, respectively.

SYDNEY HOWELL.